Oct. 27, 1959     C. E. STROBURG ET AL     2,909,886
MOWER END GUARD CLEANER
Filed Aug. 12, 1957
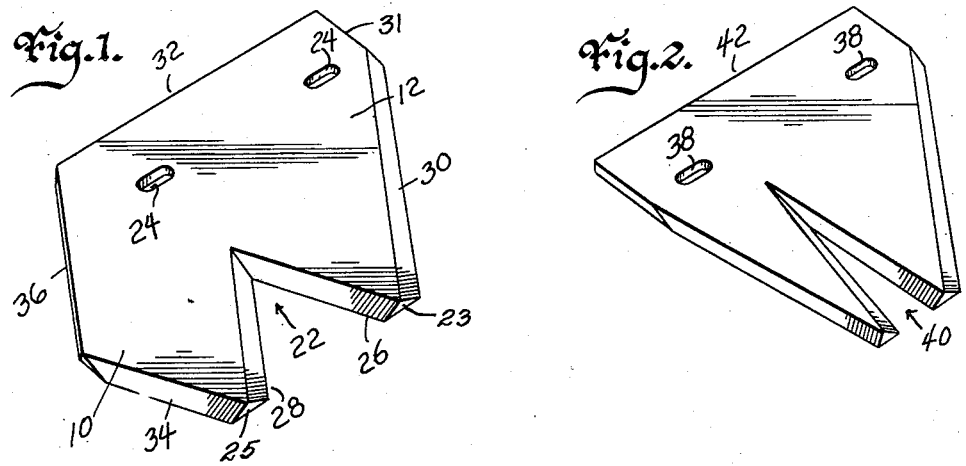
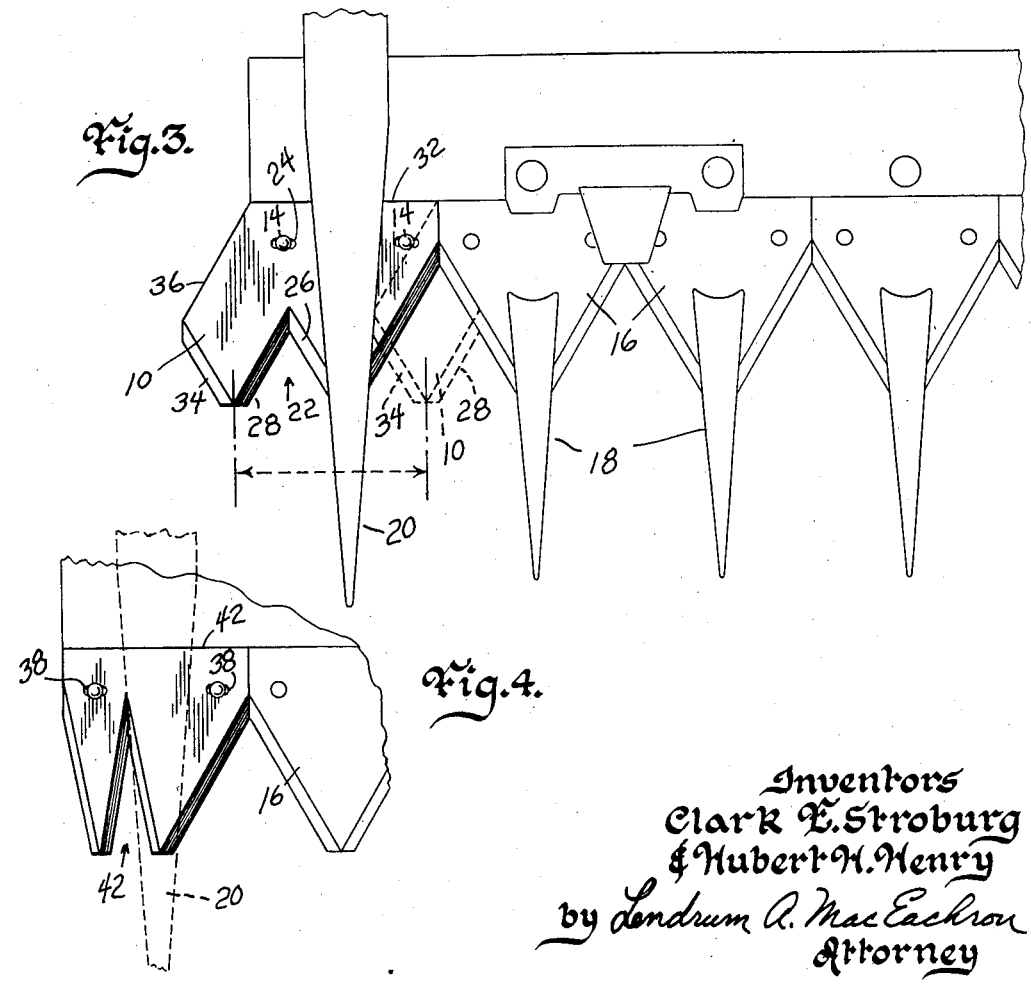
Inventors
Clark E. Stroburg
& Hubert H. Henry
by Lendrum A. MacEachron
Attorney

United States Patent Office 2,909,886
Patented Oct. 27, 1959

2,909,886

MOWER END GUARD CLEANER

Clark E. Stroburg and Hubert H. Henry,
Taylor County, Iowa

Application August 12, 1957, Serial No. 677,597

4 Claims. (Cl. 56—296)

This invention is a novel end element for mowers that prevents clogging of the end guard thereof. A primary feature of our novel cleaner element is that it extends forward from the sickle bar comparably to the regular cutting sections of a mowing machine. It also features structure that requires no alteration of the mower in order to mount our novel cleaning element on it beyond the removal of the usual end section and replacement thereof with a special end section carrying our cleaner. The rear of our novel element is slanted to prevent its catching on anything when the mowing machine is backed. The device also incorporates structure to retain normal cutting power of the usual end section.

Accordingly it is the main purpose of this invention to provide a novel mower end guard cleaner; one that:

(1) Prevents clogging of the end guard of a mowing machine.

(2) Requires no alteration of the mover for mounting.

(3) Is secured to a mowing machine to extend forward from the sickle bar thereof in the same plane as its sections.

(4) Will not catch on agricultural material when the mower is backed.

While the foregoing are the main purposes and objects of our invention, it is our intention to have as objects hereof any such as may be apparent to one skilled in the art of mowing machines after he has read the specification and examined the accompanying drawings which are briefly described as follows:

Fig. 1 is a perspective view of the preferred form of our cleaner element secured to a special end section.

Fig. 2 is a perspective view of a modified form of our novel cleaner element.

Fig. 3 is a plan view of a fragment of a mowing machine showing the cleaner in position; solid lines show the extreme outer position, and broken lines the inner one. The scale used is reduced from that of Figures 1 and 2.

Fig. 4 is a still more fragmentary plan view of the modified form of the invention on a machine; the end guard is shown in broken lines only; the scale used is that of Fig. 3.

In the drawings, the invention is seen to consist of the blade element 10, secured movably to a mowing machine in any suitable manner preferably being formed integrally with end section 12 that is secured to the sickle bar (not shown) by means of the usual rivets 14. As the sickle bar reciprocates it carries the ordinary sections 16 and end section 10—12 back and forth through the fingers or guards 18 and the end guard 20 at the end or outboard portion of the sickle. As the end section 10—12 reaches its outermost stroke, illustrated in Fig. 3 with solid lines, the cleaning portion or element 10 outboard from notch 22 passes clear through the guard 20. As element 10 comes back through the end guard 20, this cleaning element dislodges any uncut material that may have been deposited in guard 20 on the outwtard stroke of the sickle. Cleaner portion 10 is the same thickness as the section and lies in the same plane. It is sharpened, as is a regular section so it does aid in cutting tough grasses that are forced into the aperture of guard 20 through which the section 10—12 passes. While the cleaning portion 10 extends slightly beyond the guard 20 when the sickle is at the outer extreme of its stroke, it catches very little of the material being mowed. An additional guard may be placed over the section 10—12, but cleaner 10 seems to operate more efficiently uncovered than covered.

As shown exaggeratedly in Fig. 1, the end section 10—12 has laterally elongated straight sided holes 24 in it to receive the rivets 14. By elongating these rivet holes, the device is made to mount on all the known mowing machines of United States manufacture without modification thereof. Thus it is our belief that this unit will attach to any mower without need to modify the mower to receive this unit. It is secured to the sickle bar in exactly the same manner, as the old end section. Extra long rivets may be provided to insure filling the holes and thus assure lateral stability for the section 10—12 on the sickle bar.

In the preferred form of the invention as seen in Figs. 1 and 3, the notch 22 forms short cutting edges and separates the inner point 23 from the outer point 25. These two points are spaced from each other substantially one-half of the distance between the points of conventional sickle sections as mounted. This spacing between points 23 and 25 causes the latter to reciprocate through the end guard during operation of the mower, as described above and shown in the drawings. One of these two cutting edges, the one designated 26 faces outboard and the other, 28, inboard. They are preferably formed at the same angle relative to base 32, as are the usual cutting edges of a section. Long inboard facing cutting edge 30 is identical to the usual section cutting edge. Adjacent to it is inner edge 31 identical to the corresponding portion of a conventional section. Spacing between inner edge 31 and inner point 23 is, of course, conventional. There is also a short cutting edge 34 at the extreme outboard edge of the element 10. Edge 34 is formed at the usual angle also. The retention of the usual angle is to permit the use of standard cutting section sharpening equipment. It is not essential to the operation of the device. It is, however, important to the most successful introduction of the device into the economy. The two short outboard facing cutting edges 26 and 34 together equal in length the inboard cutting edge 30. Thus the same amount of cutting blade faces outboard on this end section and cleaning element as did with the old standard section that is symmetrical. The section 10—12 is forced at its dull rear outboard portion 36 to be biased more or less parallel to the inboard facing cutting edges 28 and 30. With the rear outboard edge 36 of element 10—12 formed this way, the device will not catch on agricultural materials cut or to be cut when the mowing machine is backed.

In Figures 2 and 4, a modified form of the invention may be seen. In this form, no part of the device extends farther outboard than the end of a normal end section. Elongated holes 38 are the same as for the previously described ones in the preferred form. The angles of the cutting edges of notch 40, however, are formed at a greater angle relative to base 42 than is true in the preferred form of the invention. It operates in exactly the same manner as the preferred form, however, and is different mainly in the difficulty in sharpening the cutting edges formed by notch 40. As may be seen clearly in Figures 3 and 4, our special end section is always asymmetrical and the point of the cleaning element is aligned with (Fig. 4) or lies on the outboard side of (Fig. 3) the outboard mounting hole of the special end section. For this reason the cleaning element must pass entirely through the end guard of the mower on each reciprocation of the sickle bar.

We have disclosed our invention by describing and showing a preferred practical embodiment of it, and we now set out with the particularity required by statute those novel structural features that we believe to be our invention.

We claim:

1. An outer end section for a reciprocating type mower, said section being wider than the conventional sections; said section having two points; the inner of said two points being conventionally spaced from the inner edge of the section and the outer point being spaced from the inner point of the section substantially one-half of the conventional spacing between the points of mounted, conventional sections.

2. The outer end section of claim 1 in which said outer end section has elongated, straight sided mounting holes in it.

3. The outer end section of claim 2 in which the rear outboard portion thereof is biased.

4. The outer end section of claim 1 in which the rear, outboard portion thereof is biased.

References Cited in the file of this patent

UNITED STATES PATENTS

| | | |
|---|---|---|
| 226,129 | Sutton | Mar. 30, 1880 |
| 627,871 | McBride | June 27, 1899 |

FOREIGN PATENTS

| | | |
|---|---|---|
| 154,140 | Great Britain | Nov. 25, 1920 |

UNITED STATES PATENT OFFICE

CERTIFICATE OF CORRECTION

Patent No. 2,909,886                          October 27, 1959

Clark E. Stroburg et al.

It is hereby certified that error appears in the printed specification of the above numbered patent requiring correction and that the said Letters Patent should read as corrected below.

Column 2, line 52, for "forced" read -- formed --.

Signed and sealed this 19th day of April 1960.

(SEAL)
Attest:

KARL H. AXLINE                             ROBERT C. WATSON

Attesting Officer                          Commissioner of Patents